(12) United States Patent
Wesselink

(10) Patent No.: US 8,434,825 B2
(45) Date of Patent: May 7, 2013

(54) FOOTREST

(75) Inventor: Christian Wesselink, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/313,934

(22) Filed: Dec. 7, 2011

(65) Prior Publication Data

US 2012/0139322 A1 Jun. 7, 2012

Related U.S. Application Data

(60) Provisional application No. 61/420,565, filed on Dec. 7, 2010.

(30) Foreign Application Priority Data

Dec. 7, 2010 (DE) .................. 10 2010 053 667

(51) Int. Cl.
*A47C 7/50* (2006.01)
(52) U.S. Cl.
USPC ..... 297/423.1; 297/14; 244/122 R; 244/118.6
(58) Field of Classification Search .................. 297/14, 297/423.1; 244/122 R, 118.6; 296/75, 189
See application file for complete search history.

(56) References Cited

U.S. PATENT DOCUMENTS

| | | | | |
|---|---|---|---|---|
| 807,831 A * | 12/1905 | Leslie | | 296/75 |
| 1,487,495 A * | 3/1924 | Von Germeten et al. | | 296/75 |
| 2,283,600 A * | 5/1942 | Dodson | | 280/727 |
| 3,093,414 A * | 6/1963 | Eames et al. | | 297/323 |
| 5,183,308 A * | 2/1993 | Koga et al. | | 296/75 |
| 5,312,155 A * | 5/1994 | Akima et al. | | 297/180.13 |
| 5,344,212 A * | 9/1994 | Muller et al. | | 297/245 |
| 5,374,102 A * | 12/1994 | Archambault et al. | | 297/344.13 |
| 5,826,941 A * | 10/1998 | Olsen | | 297/423.39 |
| 6,283,529 B2 * | 9/2001 | Kitagawa | | 296/75 |
| 6,318,785 B1 * | 11/2001 | Tousignant | | 296/75 |
| 6,474,732 B1 * | 11/2002 | Merensky | | 297/14 |
| 6,527,327 B2 * | 3/2003 | Gaus et al. | | 296/75 |
| 7,455,342 B2 * | 11/2008 | Lechkun et al. | | 296/64 |
| 7,510,235 B2 * | 3/2009 | Kobayashi et al. | | 296/193.01 |
| 8,109,563 B2 * | 2/2012 | Hansen | | 297/14 |
| 2003/0188672 A1* | 10/2003 | Parent et al. | | 108/134 |

FOREIGN PATENT DOCUMENTS

| | | |
|---|---|---|
| DE | 7217127 U | 10/1973 |
| DE | 3411188 A1 * | 10/1985 |
| DE | 19727598 A1 | 1/1999 |
| DE | 19953481 A1 | 5/2001 |
| DE | 102007042489 A1 | 3/2009 |

OTHER PUBLICATIONS

German Office Action dated Aug. 31, 2011 for German Application No. 102010053667.
German Patent Office, German Decision of Grant dated Nov. 5, 2012 for German Patent Application No. 10 2010 053 667.9.
German Patent Office, German Office Action dated Jun. 6, 2012 for German Patent Application No. 10 2010 053 667.9.

* cited by examiner

*Primary Examiner* — Laurie Cranmer
(74) *Attorney, Agent, or Firm* — Ingrassia Fisher & Lorenz P.C.

(57) ABSTRACT

A footrest is provided that includes a footplate element, an upper swing arm, and a lower swing arm, which footrest can be arranged on a wall that faces a seat, and allows several seating positions.

13 Claims, 4 Drawing Sheets

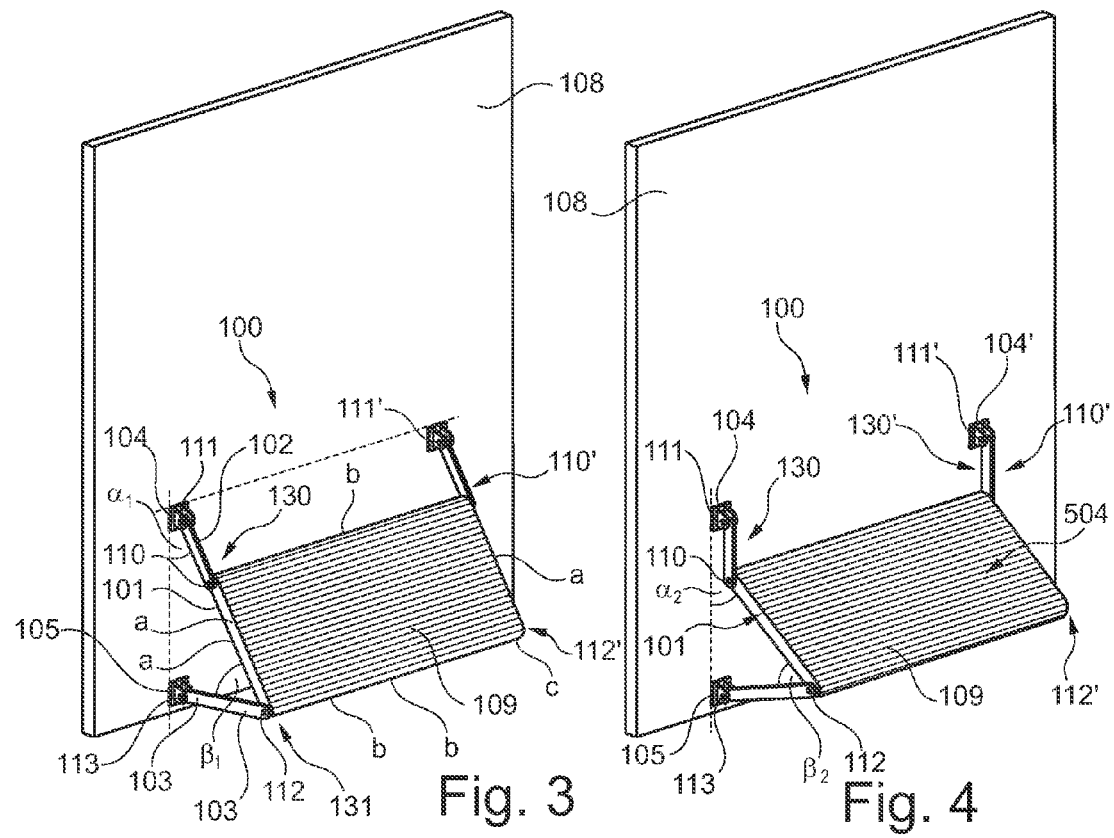
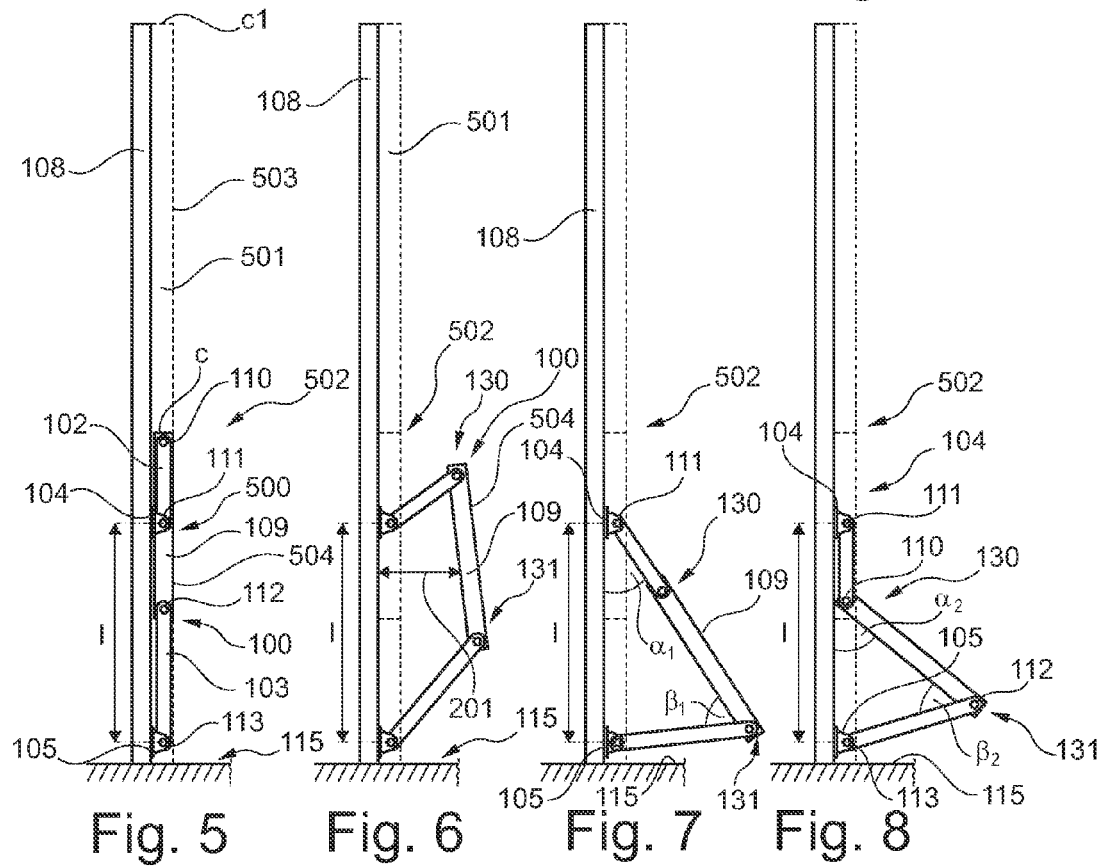

FOOTREST

CROSS-REFERENCE TO RELATED APPLICATIONS

This application claims priority to German Patent Application No. 10 2010 053 667.9 filed Dec. 7, 2010, and of U.S. Provisional Patent Application No. 61/420,565, filed Dec. 7, 2010 the disclosure of which applications is hereby incorporated herein by reference.

TECHNICAL FIELD

The present invention relates to the technical field of seats; in particular, the present invention relates to a footrest, to an item of equipment comprising a footrest, to a seat arrangement, and to an aircraft comprising a footrest.

BACKGROUND

An aircraft cabin often comprises a partition or separation between an economy class section and a business class section so that the interior space of an aircraft cabin is divided into several seating zones. In conventional aircraft the frontmost seat row of a seating zone, for example the frontmost seat row in an economy class section, is designed in such a manner that passengers of the respective frontmost seat row of a cabin zone do not have the option of supporting their feet, because the passengers are, for example, seated directly behind a partition wall or behind a cabin monument. The term "cabin monument" refers to items of equipment in cabins, e.g. to a seat, a galley or a stowage cabinet. In the case of seats arranged in rows there is an orientation of the seats. Often the orientation of a seat is in a direction of movement or in a direction of flight. A backrest of the seat separates a front and a rear of the seat from each other. The front of a seat refers to the face of the seat on which a seat area of the seat is located. The other face is referred to as the rear of the seat. Often, the orientation of the seat is selected in such a manner that the front points in the direction of flight. If at the front of the seat directly adjacent to the seat there is a partition wall or a monument, in particular if on the front there is a wall of a monument, this arrangement can be found to be annoying by a person seated on the seat.

Often a footrest can be integrated in the passenger seat so as to provide enhanced comfort. However, such seats may essentially be provided behind the frontmost seat rows if adequate legroom is present.

The lack of footrests can represent a loss of comfort, even if the aircraft operator that operates an aircraft with such an aircraft cabin and a corresponding arrangement of seats without footrests has provided a generous distance between the frontmost seat rows and the monuments and/or partition walls situated in front of the aforesaid. In individual cases a limiting seating position that does not provide an option of a foot support can in the long run be perceived as being uncomfortable by passengers, because no natural posture is supported.

Printed publication DE 10 2007 042 489 A1 describes a vehicle seat with a legrest.

SUMMARY

In one embodiment, a footrest includes a footplate element, an upper swing arm, and a lower swing arm. The footplate element includes at least a first surface area. A first end of the upper swing arm in the region of an upper edge of the first surface area is rotatably arranged on the first surface area by an upper pivot joint. The lower swing arm in the region of a lower edge of the first surface area is rotatably arranged on the first surface area by a lower pivot joint. The upper edge of the first surface area is arranged so as to be essentially parallel to the lower edge of the first surface area. The length of the upper swing arm is shorter than the length of the lower swing arm. The length of the upper swing arm is shorter than the length of the first surface area. A second end of the upper swing arm comprises an upper pivot bearing. A second end of the lower swing arm comprises a lower pivot bearing. The upper pivot bearing and the lower pivot bearing are adapted for attaching the footrest to a wall. The rotary axis of the upper pivot joint, the rotary axis of the lower pivot joint, the rotary axis of the upper pivot bearing and the rotary axis of the lower pivot bearing extend so as to be essentially parallel to each other.

In another embodiment, an item of equipment for an aircraft includes a wall, and a footrest. The footrest includes a footplate element, an upper swing arm, and a lower swing arm. The footplate element comprises at least a first surface area. A first end of the upper swing arm in the region of an upper edge of the first surface area is rotatably arranged on the first surface area by an upper pivot joint. The lower swing arm in the region of a lower edge of the first surface area is rotatably arranged on the first surface area by a lower pivot joint. The upper edge of the first surface area is arranged so as to be essentially parallel to the lower edge of the first surface area. The length of the upper swing arm is shorter than the length of the lower swing arm. The length of the upper swing arm is shorter than the length of the first surface area. A second end of the upper swing arm comprises an upper pivot bearing. A second end of the lower swing arm comprises a lower pivot bearing. The upper pivot bearing and the lower pivot bearing are adapted for attaching the footrest to a wall. The rotary axis of the upper pivot joint, the rotary axis of the lower pivot joint, the rotary axis of the upper pivot bearing and the rotary axis of the lower pivot bearing extend so as to be essentially parallel to each other. The footrest, by at least one of the pivot bearings, is attached to the wall.

In yet another embodiment, a seat arrangement includes a wall, a seat, and a footrest. The footrest includes a footplate element, an upper swing arm, and a lower swing arm. The footplate element comprises at least a first surface area. A first end of the upper swing arm in the region of an upper edge of the first surface area is rotatably arranged on the first surface area by an upper pivot joint. The lower swing arm in the region of a lower edge of the first surface area is rotatably arranged on the first surface area by a lower pivot joint. The upper edge of the first surface area is arranged so as to be essentially parallel to the lower edge of the first surface area. The length of the upper swing arm is shorter than the length of the lower swing arm. The length of the upper swing arm is shorter than the length of the first surface area. A second end of the upper swing arm comprises an upper pivot bearing. A second end of the lower swing arm comprises a lower pivot bearing. The upper pivot bearing and the lower pivot bearing are adapted for attaching the footrest to a wall. The rotary axis of the upper pivot joint, the rotary axis of the lower pivot joint, the rotary axis of the upper pivot bearing and the rotary axis of the lower pivot bearing extend so as to be essentially parallel to each other. The wall comprises a wall surface that essentially faces the seat. By the pivot bearings, the footrest is arranged in such a manner on the wall surface facing the seat that a movement of the footplate element of the footrest away from the wall reduces a distance between the seat and the footplate element.

In yet a further embodiment, an aircraft includes at least one of a footrest, an item of equipment for an aircraft, and a seat arrangement. The footrest includes a footplate element, an upper swing arm, and a lower swing arm. The footplate element comprises at least a first surface area. A first end of the upper swing arm in the region of an upper edge of the first surface area is rotatably arranged on the first surface area by an upper pivot joint. The lower swing arm in the region of a lower edge of the first surface area is rotatably arranged on the first surface area by a lower pivot joint. The upper edge of the first surface area is arranged so as to be essentially parallel to the lower edge of the first surface area. The length of the upper swing arm is shorter than the length of the lower swing arm. The length of the upper swing arm is shorter than the length of the first surface area. A second end of the upper swing arm comprises an upper pivot bearing. A second end of the lower swing arm comprises a lower pivot bearing. The upper pivot bearing and the lower pivot bearing are adapted for attaching the footrest to a wall. The rotary axis of the upper pivot joint, the rotary axis of the lower pivot joint, the rotary axis of the upper pivot bearing and the rotary axis of the lower pivot bearing extend so as to be essentially parallel to each other. The item of equipment includes a wall, and a footrest. The footrest includes a footplate element, an upper swing arm, and a lower swing arm. The footplate element comprises at least a first surface area. A first end of the upper swing arm in the region of an upper edge of the first surface area is rotatably arranged on the first surface area by an upper pivot joint. The lower swing arm in the region of a lower edge of the first surface area is rotatably arranged on the first surface area by a lower pivot joint. The upper edge of the first surface area is arranged so as to be essentially parallel to the lower edge of the first surface area. The length of the upper swing arm is shorter than the length of the lower swing arm. The length of the upper swing arm is shorter than the length of the first surface area. A second end of the upper swing arm comprises an upper pivot bearing. A second end of the lower swing arm comprises a lower pivot bearing. The upper pivot bearing and the lower pivot bearing are adapted for attaching the footrest to a wall. The rotary axis of the upper pivot joint, the rotary axis of the lower pivot joint, the rotary axis of the upper pivot bearing and the rotary axis of the lower pivot bearing extend so as to be essentially parallel to each other. The footrest, by at least one of the pivot bearings is attached to the wall. The seat arrangement includes a wall, a seat, and a footrest. The footrest includes a footplate element, an upper swing arm, and a lower swing arm. The footplate element comprises at least a first surface area. A first end of the upper swing arm in the region of an upper edge of the first surface area is rotatably arranged on the first surface area by an upper pivot joint. The lower swing arm in the region of a lower edge of the first surface area is rotatably arranged on the first surface area by a lower pivot joint. The upper edge of the first surface area is arranged so as to be essentially parallel to the lower edge of the first surface area. The length of the upper swing arm is shorter than the length of the lower swing arm. The length of the upper swing arm is shorter than the length of the first surface area. A second end of the upper swing arm comprises an upper pivot bearing. A a second end of the lower swing arm comprises a lower pivot bearing. The upper pivot bearing and the lower pivot bearing are adapted for attaching the footrest to a wall. The rotary axis of the upper pivot joint, the rotary axis of the lower pivot joint, the rotary axis of the upper pivot bearing and the rotary axis of the lower pivot bearing extend so as to be essentially parallel to each other. The wall comprises a wall surface that essentially faces the seat. By the pivot bearings, the footrest is arranged in such a manner on the wall surface facing the seat that a movement of the footplate element of the footrest away from the wall reduces a distance between the seat and the footplate element.

BRIEF DESCRIPTION OF THE DRAWINGS

Below, further exemplary embodiments of the present invention are described with reference to the figures.

FIG. 3 shows a footrest in a folded-out position for persons of small stature according to an exemplary embodiment of the present invention;

FIG. 4 shows a footrest in a folded-out position for tall persons according to an exemplary embodiment of the present invention;

FIG. 5 shows a lateral view of the position shown in FIG. 1 of the footrest according to an exemplary embodiment of the present invention;

FIG. 6 shows a lateral view of the position shown in FIG. 2 of the footrest according to an exemplary embodiment of the present invention;

FIG. 7 shows a lateral view of the position shown in FIG. 3 of the footrest according to an exemplary embodiment of the present invention;

FIG. 8 shows a lateral view of the position shown in FIG. 4 of the footrest according to an exemplary embodiment of the present invention;

DETAILED DESCRIPTION

Figure 1:
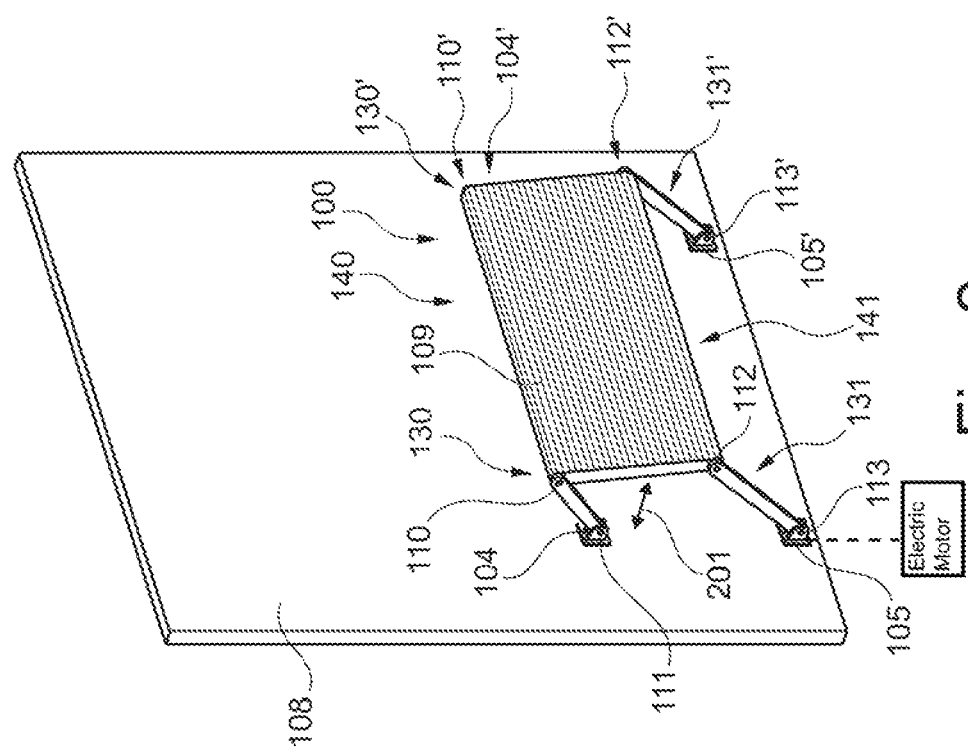
FIG. 1 shows a footrest in a stowed-away position according to an exemplary embodiment of the present invention.

The illustrations in the figures are diagrammatic and not to scale. In the following descriptions of FIGS. 1 to 11 the same reference characters are used for equal or corresponding elements.

FIG. 1 shows the footrest 100, which is arranged on the wall 108, in a stowed-away position according to an exemplary embodiment of the present invention. The footrest can be a footrest for an aircraft cabin, wherein the footrest 100 is arranged on the wall 108. In FIG. 1 the wall 108 is shown as a section of a wall, for example of a wall of an aircraft cabin or of a flight crew rest compartment (FCRC). However, the wall 108 can also be any other section of an item of equipment, of a partition wall or of a cabin monument, for example of a seat, a galley or of a stowage cabinet. The footrest according to the invention can be used for any type of vehicle, although hereinafter it is essentially only described in relation to an aircraft.

The footrest 100 comprises the footplate element 109 which in FIG. 1 is designed as a cuboid. A lateral surface of the footplate element 109, which lateral surface points away from the wall, comprises a footplate profile 504, for example a ribbing or corrugation arrangement. The footplate element 109 comprises the upper swing arm 102, the lower swing arm 103, a further upper swing arm 102', and a further lower swing arm 103'. The upper swing arm 102 or top swing arm 102 is rotatably attached, by means of the rotary axis 110, to the footplate element 109 in the region of the upper edge 140 of the footplate element. The rotary axis 110 together with the upper swing arm 102 and the footplate element 109 forms an upper pivot joint 130.

On a first end the bottom swing arm 103 or lower swing arm 103 comprises the rotary axis 112 by means of which the lower swing arm 103 is rotatably attached to the footplate element 109 in the region of the lower edge 141. Both the lower swing arm 103 and the upper swing arm 102 are arranged on the first surface area 101 of the footplate element, while the further lower swing arm 103' and the further upper swing arm 102' are arranged on the second surface area 101'. The first surface area 101 and the second surface area 101' may form facing surfaces 101, 101' of the footplate element. In this arrangement the pivot joints 130, 131 are spaced apart from each other. The distance between the rotary axes 110 and 112 of the pivot joints essentially corresponds to the length of the first surface area 101 and thus essentially to the length a. In the stowed-away position the length a essentially extends along those edges of the footplate element 109 which extend so as to be essentially perpendicular to the floor 115. The length a essentially extends along a normal vector or unit vector which is directed from the lower axis 112, 112' to the upper axis 110, 110' or vice versa.

The upper edge 140 and the lower edge 141 essentially comprise the length b. The lower edge 141 or bottom edge 141 is distanced further away from the floor 115 than is the upper edge 140 or top edge 140. In another example, the lower edge 141 is closer to the floor 115 than is the upper edge 140. In the region of the upper edge 140 there is also an upper edge of the first surface area 101. In the region of the lower edge 141 there is also a lower edge of the first surface area 101. The upper edge of the first surface area 101 is essentially arranged at a right angle to the upper edge 140 of the footplate element 109. The lower edge of the first surface area 101 is essentially arranged at a right angle to the lower edge 141 of the footplate element 109. The lower edge of the first surface area and the upper edge of the first surface area are essentially arranged at a right angle to a length of the first surface area; they essentially determine the height of the footplate element and are thus referred to as height edges.

In a stowed-away position the first surface area 101 or first face area 101 is arranged so as to be essentially at a right angle or orthogonal to the wall 108.

On the second end of the upper swing arm 102 the upper pivot bearing 104 is arranged. On the second end of the lower swing arm 103 the lower pivot bearing 105 is formed. By means of the rotary axis 111 the upper pivot bearing 104 makes possible a planar movement of the upper swing arm 102. By means of the rotary axis 113 the lower pivot bearing 105 makes possible a planar movement of the lower swing arm 103.

The upper pivot bearing 104 and the lower pivot bearing 105 are installed to the wall 108 in such a manner that the pivot bearings 104, 105 are arranged in a line. In other words, this may mean that in a stowed-away position corresponding edges of the pivot bearings 104, 105 are situated on a shared imaginary line or reference line, i.e. that the edges of the pivot bearings are aligned. It may thus be ensured that the swing arms essentially move in the same plane. Examples of reference lines are indicated by dashes in FIG. 3.

The footplate element 109, which is in the shape of a cuboid, comprises length edges of the length a, width edges of the length b, and height edges of the length c. The length edges extend so as to be essentially parallel to a normal vector from the lower rotary axis 112, 112' to the upper rotary axis 110, 110'. The width edges extend so as to be essentially parallel to the rotary axes 110, 110', 112, 112'. The height edges extend so as to be essentially perpendicular to a surface area that is defined by a normal vector through at least one of the rotary axes 110, 110', 112, 112' and by a normal vector that points from the lower rotary axis 112, 112' to the upper rotary axis 110, 110' or vice versa. The plane in which this surface area is situated may be designated the footplate plane.

The first surface area 101 and the second surface area 101' are defined by the length edges and the height edges. The width edge is longer than the length edge, and the length edge is longer than the height edge. Thus the following applies: b>a>c. The cuboid 109 comprises a symmetry plane that intersects the footplate area in the straight line 120 and that is shown in a dashed line in FIG. 1. The symmetry plane extends so as to be essentially parallel to the first surface area 101 and to the second surface area 101'. In relation to this symmetry plane or mirror plane the footrest, in particular the cuboid, is mirror symmetrical. The mirror plane represents an imaginary plane that is orthogonal to the footplate area. In other words, the mirror plane and the footplate area essentially form a right angle. The footplate area, the footplate surface area or the footplate plane is defined by a length edge of the length a and a width edge of the length b, wherein the footplate area of the stowed-away position shown in FIG. 1 is that surface area of the cuboid, which surface area is furthest away from the wall 108. The stowed-away position is a position in which the footplate element 109, in particular the footplate area, is situated so as to be essentially parallel to the wall 108.

Due to the predominant mirror symmetry relating to the symmetry plane through the straight line 120, which is essentially positioned at the length b/2, the explanations relating to the swing arms, pivot bearings and pivot joints that are arranged on the first surface area 101 also apply to the corresponding pivot bearings, swing arms and pivot joints that are arranged on the second surface area 101'.

Corresponding objects are, for example, the upper swing arm 102 and the further upper swing arm 102', the rotary axis 110 and the rotary axis 110', the first surface area 101 and the second surface area 101', the upper pivot bearing 104 and the further upper pivot bearing 104', the rotary axis 111 and the rotary axis 111', the rotary axis 112 and the rotary axis 112', the lower swing arm 103 and the further lower swing arm 103', the lower pivot bearing 105 and the further lower pivot bearing 105', as well as the rotary axis 113 of the lower pivot bearing 105 and the rotary axis 113' of the further lower pivot bearing 105'.

The upper swing arm or the further upper swing arm 102, 102' comprise the length o, and the lower swing arm 103 and the further lower swing arm 103' comprise the length u. The length o is shorter than the length u. The length o is, however, also shorter than the length a of the footplate element 109. In another example the length o can, however, also be longer than the length a of the footplate element 109 or it can be essentially the equal length or the same length.

For simplification it may be assumed that the distance of the rotary axis 110 of the upper pivot joint 130 and of the rotary axis 111 of the upper pivot bearing 104 is essentially determined by the length of the upper swing arm 102, and is thus essentially the length o. The same may analogously apply to the distance of the rotary axis 110' of the further upper pivot bearing 130' and of the rotary axis 111' of the further upper pivot bearing 104'.

The distance of the rotary axis 112 of the lower pivot joint 131 from the rotary axis 113 of the lower pivot bearing 105 may essentially be determined by the length of the lower swing arm 103 and may thus be u. The same may analogously apply to the distance of the rotary axis 112' of the further lower pivot joint 131' and of the rotary axis 113' of the further lower pivot bearing 105'.

For the sake of simplicity, in the following considerations any distances that are necessary for the stable affixation of the rotary axes 110, 110', 111, 111', 112, 112', 113, 113' in the swing arms or pivot bearings are neglected, although they are also present. The distance between the rotary axis 110 of the upper pivot joint 130 and the rotary axis 112 of the lower pivot joint 131 may essentially be determined by the length edge of the first surface area 101 and may thus essentially be a. The same applies analogously to the distance of the rotary axes 110' and 112'.

As a result of the height edge of the length c, in the stowed-away position shown in FIG. 1 the footplate element 109, in particular the footplate area, projects from the wall 108 and forms a free passage area 106, which in FIG. 1 is shown as a shaded surface area 106. In particular, the passage area forms a space region 106. In a folded-in state this space region 106 can essentially without any loss of foot space open a passage between the floor 115 and the footplate element 109, in other words underneath the footplate element in the foot space. In an installation of the footplate element 109 on a seat 108 the passage 109 can essentially be regarded as a space underneath the seat of a passenger in front. In other words, a seat may be described which on its rear pointing away from the seat area comprises the footrest 100.

The upper swing arm 102, the footplate element 109, in particular the first surface area 101, the lower swing arm 103 together with the wall 108, in particular the section of the wall between the upper pivot bearing 104 and the lower pivot bearing 105, form a four-element pivot-joint gear arrangement or a four-element rotary joint mechanism. Likewise, the upper swing arm 102', the footplate element 109, the lower swing arm 103', and the pivot bearings 104' and 105' form a four-element pivot-joint gear arrangement. At least one pivot bearing and/or at least one pivot joint of the footrest can comprise an electric motor.

An essentially unstable position in the stowed-away position can result in vibration of the footplate element in the folded-in state because it can move both backwards, i.e. in the direction of flight or in the direction of the wall, and forwards, i.e. in the direction of the seat. Such vibration and thus an unstable position can be prevented in that in this state a direction of movement is specified to the system. A direction of movement can, for example, be specified by a spring, a magnet or an eccentric bearing arrangement with the upper pivot bearings 104, 104' in that the distance between the axis of the bearing and the wall is reduced. With this eccentric arrangement a weight force in the direction of folding-out, i.e. in the direction of the seat, can be generated. Corresponding magnets provided on the footplate element and on the wall can also make possible stable stowing-away of the footrest.

Folding out the footrest can take place more easily when a force in the region of the lower pivot joints 131, 131' directed away from the wall 108 is exerted than is the case, for example, if said force is applied, for example, in the region of the upper pivot joints 130, 131'. In order to support a passenger when moving out the footrest, in the region of the lower pivot joints 131, 131', i.e. on a lower width edge of the footplate element 109, a handle can be provided.

The stowed-away position shown in FIG. 1 represents an unstable position. In order to increase the stability of the position a rotary axis of the upper pivot bearings 104, 104' and at the same time of the lower pivot bearings 105, 105' can be arranged at a larger distance to the wall than the other rotary axes 110, 110', 112, 112' so that the footplate element in its stowed-away position is pushed against the wall by its own weight force. Consequently, by means of eccentric positioning of the swing arm bearings, in particular of the rotary axes of the pivot bearings 104, 105, 104', 105', a force can be generated. In another example the axes of the upper pivot bearings 104, 104' can be arranged at a smaller distance than the axes of the lower pivot bearings 105, 105' in order to achieve the effect of eccentrically positioning.

The broadside of the cuboid 109 is formed by the edges of the lengths c and b. In the stowed-away position the swing arms 102, 103, 102', 103' rest essentially at right angles to the surface areas formed by the broadside of the cuboid 109 against the cuboid. The distance of the symmetrically arranged pivot bearings 104, 104' is dimensioned such that in the stowed-away position the footplate element 109 is arranged between the upper pivot bearing 104, the upper swing arm 102, the further upper swing arm 102', and the further upper pivot bearing 104'. The height of the pivot bearings 104, 104', 105, 105' by which height the pivot bearing projects from the wall essentially corresponds to the length c of the height edge of the cuboid 109 and thus comprises the height c. The width of the swing arms 102, 102', 103, 103' also essentially corresponds to the length c. In the stowed-away position the footplate area of the footplate element 109 is the surface area of the footrest 100, which surface area is spaced apart furthest from the wall 108. The footplate area is defined by the edges of the length a and the length b.

Figure 2:
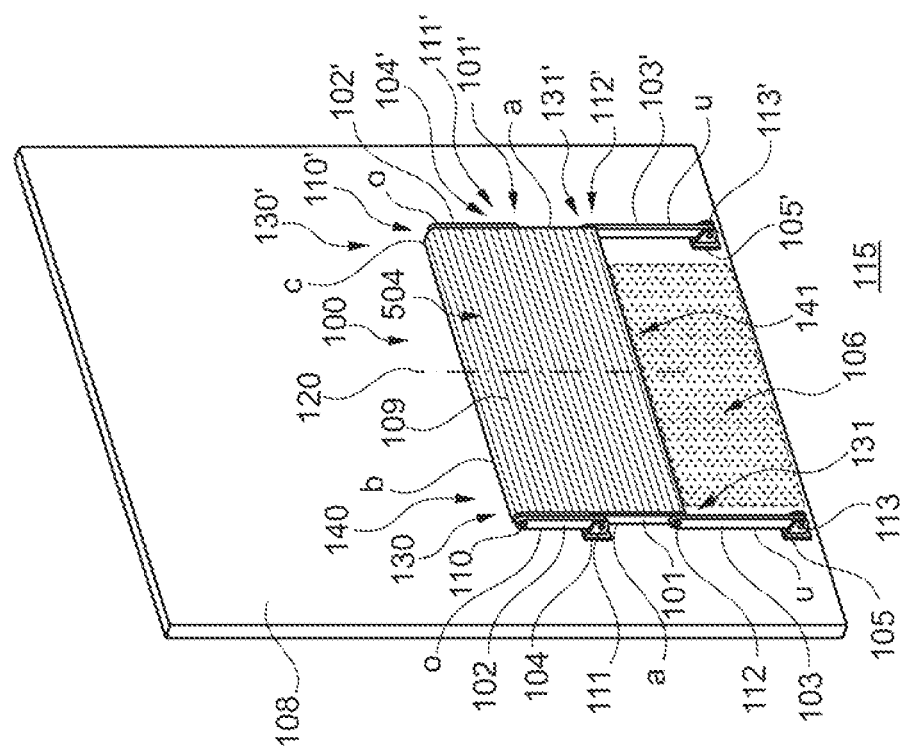
FIG. 2 shows a footrest in an arbitrary intermediate position during the folding-out of the footrest according to an exemplary embodiment of the present invention.

FIG. 2 shows the footrest 100 in an arbitrary intermediate position during the folding-out of the footrest 100. FIG. 2 shows that the footplate element 109 has been moved away from the wall 108 so that between the wall 108 and the footplate element 109 essentially a distance 201 has formed. In this process the footplate element 109 has rotated slightly. In the position shown in FIG. 2 the rotary axes 111, 113, 111' (not visible in FIG. 2), 113' of the pivot bearings 104, 105, 104' (not visible in FIG. 2), 105' are situated on a shared plane, while the rotary axes 110, 110' (not visible in FIG. 2), 112, 112' (not visible in FIG. 2) of the upper pivot joints 130, 130' and of the lower pivot joints 131, 131' are at a distance from the shared plane of the pivot bearings. However, as a result of the larger distance 201 from the wall 108 a distance between a seat (not shown in FIG. 2) and the footplate element 109 has been reduced. The seat should essentially be opposite the wall 108, and consequently in this intermediate position the footrest 100 can already be reached more easily by a person seated in the seat than is the case in the stowed-away position of FIG. 1.

FIG. 3 shows the footrest 100 according to an exemplary embodiment of the present invention in a folded-out position for persons of small stature or for smaller persons. During a movement from the stowed-away position of FIG. 1 by way of the intermediate position of FIG. 2 to the folded-out position for persons of small stature the axis 110 of the pivot joint 130 respectively the axis 112 of the pivot joint 131 describes a circular movement on the axis 111 of the pivot bearing 104 and on the axis 113 of the pivot bearing 105, respectively. In this arrangement the radius of the circular movement of the rotary axis of the upper pivot joint 130 essentially corresponds to the length o of the upper swing arm. The radius of the circular movement of the rotary axis 112 of the lower pivot joint 131 essentially corresponds to the length u of the lower swing arm.

The folded-out position for persons of small stature corresponds to an alignment of the footplate element 109 or of the rotary axes 110, 110', 111, 111', 112, 112' so that the rotary axes 110, 110', 111, 111', 112, 112' are essentially situated on a shared plane.

The footplate plane, which is essentially defined by the length edge and width edge, may be situated in this shared plane. This shared plane, in particular if the plane is assumed to comprise a height c rather than being considered a dimensionless ideal plane, is essentially defined by the width edge and the length edge of the cuboid 109. Generally speaking, in this document the term "plane" can refer to a plane with dimensions in all spatial directions.

The footplate plane is essentially formed by a normal vector along the rotary axis 112 of the lower pivot joint 131 and along a normal vector that extends from the rotary axis 112 of the lower pivot joint 131 to the rotary axis 110 of the upper pivot joint 130. The footplate plane may also be formed by a normal vector through the rotary axis 110 of the upper pivot joint 130 and by a normal vector that extends from the rotary axis 110 of the upper pivot joint 130 in the direction of the rotary axis 112 of the lower pivot joint 131.

In the position for persons of small stature an edge of the upper swing arm 102, 102' represents a continuation of a length edge of the cuboid so that the rotary axis 112 of the upper pivot bearing 131 is essentially situated at a distance of o+a from the rotary axis 111 of the upper pivot bearing 104. At the same time the axis 112 is essentially situated at a distance u from the axis 113 of the lower pivot bearing 105.

The rotary axes 112, 112' of the lower pivot joints 131, 131' and the rotary axes 113, 113' of the lower pivot bearings 105, 105' define a further plane, which intersects the footplate plane at an angle $\beta 1$. In particular, the axes 112, 112' and 113, 113' are situated in such a plane. The rotary axes 112 and 112' represent an intersecting line between the footplate plane and the plane, defined by the swing arm 103 and by the rotary axes 113, 112, 112', 113', 103', of the so called lower swing arm plane. Essentially the angle $\alpha 1$ is formed between the wall and the footplate plane.

In the folded-out position, shown in FIG. 3, for persons of small stature, essentially a plane or surface area is defined by the upper swing arm 102, by the first surface area 101 and the lower swing arm 103, wherein the first surface area 101, the swing arm 102, and the swing arm 103 are essentially situated in this plane. The surface area defined in this manner is arranged so as to be essentially orthogonal to the footplate plane.

In other words a normal vector along the axes 112, 112' of the lower pivot joints and along the length edge of the length a of the first surface area 101, i.e. a normal vector directed from the axis 112, 112' of the lower pivot joint 131 to the axis 110, 110' of the upper pivot joint 130, may essentially define the footplate plane with a height c. This may mean that the footplate element or footboard essentially determines the footplate plane. The normal vector along the rotary axes 112, 112' of the lower pivot bearing 131 together with a normal vector along a longitudinal direction of the lower swing arm 103, e.g. a normal vector that is directed from the rotary axis 112 to the rotary axis 113, may define a further plane or plane of the lower swing arm or a lower swing arm plane, wherein these two planes intersect at an angle $\beta 1$. In this arrangement the planes may not be assumed to be ideal planes with a dimension of 0 but instead to have a finite dimension, for example the height c.

FIG. 4 shows the footrest in a maximum folded-out position for tall persons. In the folded-out position the rotary axes 110, 110', 111, 111' and 113, 113' are situated in a shared plane that is parallel to the wall 108. In the maximum folded-out position the footplate plane is essentially defined or spanned by a normal vector extending through the rotary axis 112 or 112' and a normal vector along a longitudinal side of the first surface area 101, wherein the normal vector points from the rotary axis 112 in the direction of the rotary axis 110 of the upper pivot joint 130. Here again, the planes may be assumed to be planes with a certain dimension, for example the height c.

In the maximum folded-out position for tall persons the rotary axis 110 of the upper pivot joint 130 or the rotary axis 110' of the upper pivot joint 130' comes to rest between the upper pivot bearing 104 or 104' and the lower pivot bearing 105 or 105' (not shown in FIG. 4). Between the footplate plane and the plane of the lower swing arm the angle $\beta 2$ forms, wherein the angle $\beta 2$ is smaller than the angle $\beta 1$.

A plane defined or spanned by a normal vector along the rotary axes 110, 110' of the upper pivot joints 130, 130' and by a normal vector that is directed from the rotary axes 110, 110' of the upper pivot joints 130, 130' in the direction of the rotary axes 111, 111' of the upper pivot bearings 104, 104' may be designated a plane of the upper swing arm or as upper swing arm plane. An angle $\alpha 2$ may form essentially between the wall and the footplate plane or between the plane of the upper swing arm and the footplate plane. The angles $\alpha 1$, $\alpha 2$, $\beta 1$, $\beta 2$ are essentially determined by the circumstances of the swing arm mechanism and the arrangement of the pivot bearings relative to each other.

Since the pivot bearings and the pivot joints essentially only permit planar rotations, displacement of the footplate element 109 along the rotary axes 110, 111, 112, 113, 110', 111', 112', 113' is essentially prevented. With the arrangement by means of at least four pivot bearings and pivot joints a complete rotation, i.e. a rotation by 360 degrees, on at least one of the rotary axes is prevented. Because of the arrangement of the upper swing arm 102 on the wall 108 a maximum rotation of the upper swing arm 102 by essentially 180 degrees is supported. In all the positions of the footrest the footplate profile 504 of the footplate area or of the footplate plane essentially points away from the wall 108.

FIG. 5 shows a lateral view of the footrest 100 in the stowed-away position according to FIG. 1. In the stowed-away position it is evident that the footplate element 109 comes to rest so as to be essentially parallel to the wall 108. The footplate element 109 comprises a height c, so that the footplate profile 504 affixed to the footplate area is essentially arranged at a distance c from the wall. The footplate area may be that surface of the footplate element 109 which is provided as a foot support.

The wall 108 can comprise a projection 501 that comprises a height c1 or thickness c1, wherein the projection 501 further comprises a recess 502 that is provided so that the footplate element 109 can be folded into the projection 501 or into the recess 502 in such a manner that the footplate area 500 including the footplate profile 504 finishes off so as to be essentially flush with the surface 503 of the projection so that the footrest 100 essentially comes to rest between the wall 108 and the surface of the projection 503. The surface 503 of the wall can essentially be continued by the footplate area 500. The thickness c1 of the projection 501 essentially corresponds to the height c of the footplate element 109.

FIG. 5 shows that the rotary axes 113, 112, 111, 110 are essentially situated in the same plane. Essentially also in the rest position according to FIG. 5 the lower swing arm 103, the footplate element 109 and the upper swing arm 102 are situated in this plane. A good look at the footplate plane, the plane of the upper swing arm, and the plane of the lower swing arm shows that these planes are essentially situated on top of each other or that their normal vectors are situated so as to be essentially parallel to each other. In FIG. 5 the distance between the rotary axes 110, 111, 115, 113 and the wall 108 is essentially half c/2 the height c of the footplate element 109.

FIG. 5 shows a shorter distance between the swing arms 102, 103 and the wall 108, or between the footplate element 109 and the wall 108, which distance should, however, be ignored in the consideration of the sizes.

FIG. 6 shows a lateral view of the footrest 100 in the intermediate position shown in FIG. 2. In order to make this position stable the rotary axes 110, 111, 112, 113 can comprise a click-lock mechanism. The diagram shows that a distance 201 has formed between the footplate element 109 or the corresponding footplate element plane and the wall 108, wherein the footplate element 109 has been displaced in such a manner that the footplate plane and a surface area or plane formed by the wall 108 intersect. The wall plane is essentially formed by a normal vector through the rotary axis 111 of the upper pivot bearing 104 and a normal vector that extends from the rotary axis 111 of the upper pivot bearing 104 in the direction of the rotary axis 113 of the lower pivot bearing 105. The footplate plane and the wall plane intersect in an intersection, wherein this intersection essentially comprises a shorter distance to the rotary axis 111 of the upper pivot bearing 104 than to the rotary axis 113 of the lower pivot bearing 105.

FIG. 7 shows a lateral view of the footrest 100 of FIG. 3 in its folded-out position for persons of small stature. The footplate element 109, in particular the footplate plane, intersects the wall plane essentially in the rotary axis 111 of the upper pivot bearing 104 so that as a result of the movement from the intermediate position of FIG. 6 to the position of FIG. 7 the intersection has moved so as to be closer to the rotary axis 111 of the upper pivot bearing 104. The distance between the upper pivot bearing 104 and the lower pivot bearing 105 is equal to the length 1. The distance between the upper pivot bearing 104 and the lower pivot bearing 105 has not changed as a result of the movement of the footplate area 109. The pivot bearings 104 and 105 as well as the pivot joints 130 and 131 can comprise a click-lock mechanism that stabilizes the folded-out position for persons of small stature. The movement from the intermediate position of FIG. 6 to the folded-out position for persons of small stature can be supported by the gravitational force of the footplate element 109, wherein the aforesaid can be pointed in the direction of the floor 115.

Between the plane of the lower swing arm and the footplate plane essentially the angle β1 forms, while between the plane of the upper swing arm, in particular of the footplate plane, and the wall plane the angle α1 is formed. The plane of the upper swing arm and footplate plane are positioned so as to be essentially one on top of the other according to FIG. 7, i.e. they are situated in a shared plane.

FIG. 8 shows a lateral view of the footrest in its maximum folded-out position for tall persons as shown in FIG. 4. The diagram shows that the intersection between the footplate plane and the wall plane or between the footplate plane and the plane of the upper swing arm in this position essentially extends through the rotary axis 110 of the upper pivot joint 130, wherein the rotary axis 110 of the upper pivot joint 130 comes to rest between the rotary axis 111 of the upper pivot bearing 104 and the rotary axis 113 of the lower pivot bearing 105. In this arrangement the footplate plane intersects the plane of the upper swing arm essentially at the angle α2.

The footplate plane intersects the plane of the lower swing arm essentially along the rotary axis 112 of the lower pivot bearing 131 essentially at the angle β2.

In the figures FIG. 1 to FIG. 4 or FIG. 5 to FIG. 8 the lower pivot bearing 105 is arranged at a shorter distance to the floor 115 than is the upper pivot bearing 104. Furthermore, in relation to all the positions the distance between the upper pivot joint 130 and the floor 115 is greater than the distance between the lower pivot joint 131 and the floor 115.

The floor 115 can be the floor or foot region of an aircraft cabin.

Figure 9:
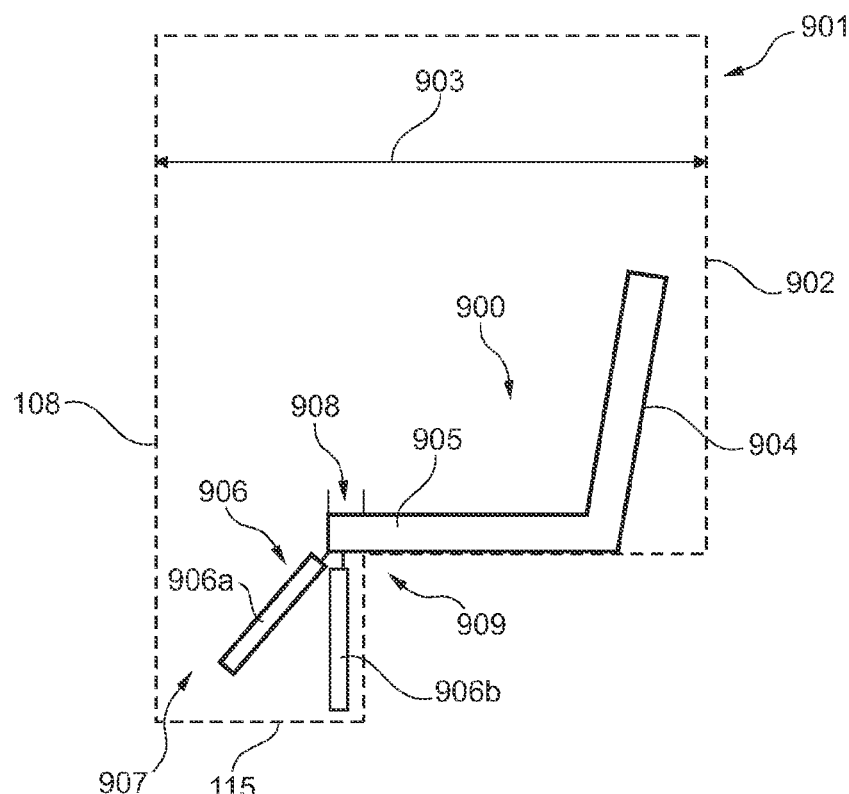
FIG. 9 shows a section view of a seat arrangement of a seat with an integrated footrest to provide a better understanding of the present invention.

FIG. 9 shows a seat 900 in a crew rest compartment 901, wherein the crew rest compartment comprises a rear wall 902 and a front wall or partition wall 108. The wall 108 is spaced apart from the rear wall 902 by the distance 903. The seat 900 comprises the backrest 904 and the seat area 905 as well as the footrest 906. The footrest 906 is integrated in the seat 900, and FIG. 9 shows an extended position 906a and a stowed-away position 906b of the integrated footrest. The seat 900 and the footrest 906 are situated above the floor 115 or cabin floor 115 in the foot region 907. In order to be able to bring the footrest 906 to the stowed-away position 906b, an overhang 908 above the seat installation region 909 must be provided that causes the seat 900 to have to be arranged at a large distance from the rear wall 902, which distance corresponds at least to the overhang 908.

Figure 10:
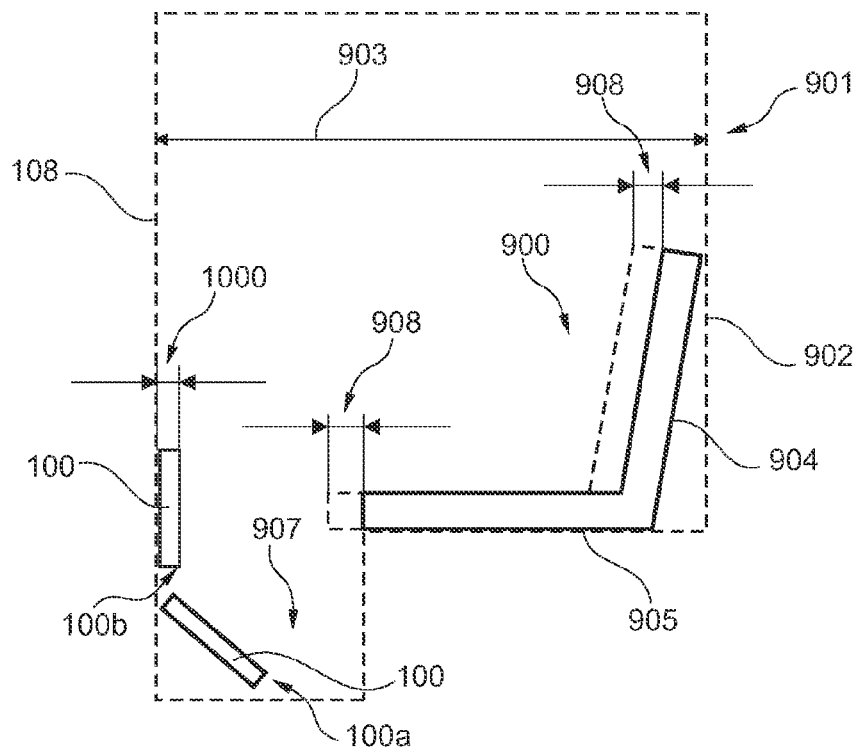
FIG. 10 shows a section view of a seat arrangement with a wall-mounted footrest according to an exemplary embodiment of the present invention.

FIG. 10 shows the crew rest compartment 901 that comprises the footrest 100 according to the invention, wherein the footrest 100 is shown in a folded-out position 100a and in a stowed-away position 100b. As a result of the installation of the footrest 100 to the wall 108 a space region 1000, which essentially comprises the height c, is lost because the footrest 100 is stowed away. However, it is possible to abandon the overhang 908 of the seat 900 so that the seat 900 can be installed so as to be closer to the rear wall 901 by the distance or overhang 908. Consequently more space is created in the foot region 907 because the gain resulting from abandoning the overhang 908 is essentially greater than the loss of the space 1000. For example, passing through the foot region 907 can be made easier. The distance between the backrest 904 and the rear wall 901 is shorter in FIG. 10 than is the distance between the backrest 904 and the rear wall 902. The available installation space 903 in FIG. 9 is the same as that in FIG. 10.

Thus by means of the footrest installed to the wall 108 additional space and thus comfort can be gained when compared to the calf-supporting footrest shown in FIG. 9.

Figure 11:
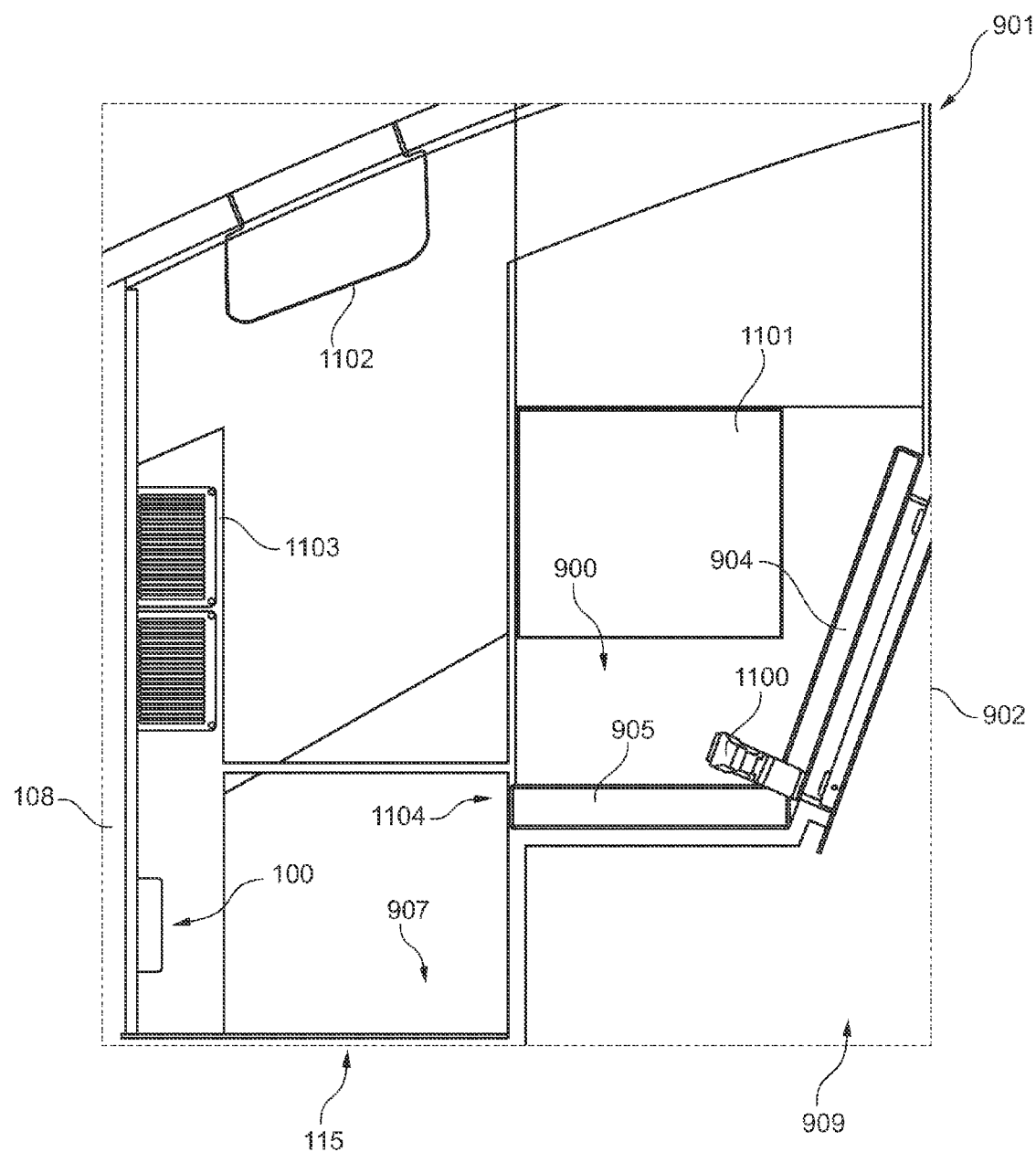
FIG. 11 shows a section view of a crew rest compartment with a seat arrangement according to an exemplary embodiment of the present invention.

FIG. 11 shows a simplified lateral view of a crew rest compartment (FCRC) or flight crew rest compartment in a long-range aircraft. This section of a three-dimensional illustration shows the crew rest compartment 901 with the rear wall 902, wherein the rear wall 902 is formed by the space 909 for a galley. The footrest 100 is arranged in the foot region 907, opposite the seat 900 which comprises a backrest 904 and a seat area 905. The footrest 100 is arranged at a shorter distance from the seat area 905 than it is from the backrest 904.

The seat 900 also shows the belt 1100 as well as a window 1101 arranged beside the seat, and a maintenance duct 1102 arranged in the sidewall, as well as the ventilation slits 1103 arranged in the sidewall. In the case of a crew rest compartment the floor 115 is formed by the cabin ceiling of a passenger cabin situated underneath the crew rest compartment. The footrest 100 is arranged on the wall 108, wherein both the footrest 100 and the wall 108 are arranged at a distance opposite to the seat 900. The distance between the wall and the seat 900 is greater than the distance between the footrest 100 and the seat or a plane that extends along a front edge 1104 of the seat area 905.

The foot region 907 that has been enlarged by means of the footrest 100 can ensure adequate legroom even in confined seating configurations. In a confined seating configuration the installation space 903 predetermined by the arrangement of the seat and a wall 108 (not shown in FIG. 11) is limited.

In a visual sense, too, partition walls 108 or rearwards-facing walls of cabin monuments 108 can have a cramped impression on passengers in the first seat rows. Footmarks on the walls 108 can reinforce this subjective impression or can negatively affect passenger wellbeing. Footmarks can result when no adequate footrests are provided.

Above all in long-haul flights the aircraft cabin or the seat arrangement is frequently criticized by passengers because of the limited seating comfort provided by a high-density cabin layout. However, this criticism can not only relate to the quality of the seat arrangement but also to the necessity, due to space reasons, to remain in the same seating position for several hours. Sitting in the same seating position over an extended period of time is contrary to the natural habit of the human body.

While crew rest compartments for flight attendants provide seating options, for reasons associated with weight and cost they are, however, often of a simple design and thus frequently do not provide footrests. However, if seats with integral footrests are used which due to the required stowability within the seat often comprise elaborate mechanisms, the elaborate mechanism can in turn increase the weight of the seat.

Consequently, in particular in seat arrangements in the frontmost seat row in the cabin, and in seat arrangements in crew rest compartments, the proposed footrest 100 can provide an aircraft operator with a space-saving and weight-optimized option, with little expenditure to provide footrests for the usually confined seat rows and the crew rest compartments in the aircraft. As a result of this an increase in comfort can result in the hitherto neglected seat rows or crew rest compartments.

Consequently the use of a footrest that can be installed on a wall 108 in a crew rest compartment or the use of the footrest in one of the frontmost seat rows in a cabin is described.

The aspect of the frontmost seat rows results, in particular, from the division of seating zones or sections. For example, the economy class section represents a seating zone that is divided off from the business class section. By means of the footrest according to the invention a natural sitting posture can also be maintained in the frontmost seat rows, i.e. in a seat row that is arranged so as to face a wall or some other monument. Furthermore, the use of the proposed footrest can reduce the occurrence of footmarks on the walls 108 and can make a contribution to upgrading a seat or space arranged near a wall or a front wall 108. Because, despite a confining effect that results because of the proximity of a seat 900 to a front wall 108, to some other monument, to a rear wall of a monument 108, or to a rear of a monument 108, as a result of the provision of the footrest 100 the front seating position can be perceived to be associated with a special privilege. Furthermore, the vertical plane or wall surface can be visually upgraded in that the vertical plane is broken by a comfort feature.

Frequently the distance between the front wall 108 and a seat 900 in the seat arrangement is designed so as to be particularly large in order to compensate for the proximity to the wall 108 and thus to provide a short foot region. The footrest 100 can make a contribution to the effect that despite the close arrangement of the seat 900 from the wall 108 the proximity is not perceived to be uncomfortable, because a support for the feet is provided.

The provision of the footrest 100 can make it possible for a passenger to enjoy natural and thus comfortable sitting in frequently changing seating positions. At the same time, essentially the foot space 907 is not lost, because in the folded-in state a passage underneath the footplate element 109 of the footrest 100 can be released. Thus it is possible to use space underneath the seat of the passenger seated in front if the wall 108 is the rear of a seat of the passenger seated in front, i.e. of a passenger who is essentially seated in the direction of flight in front of the passenger concerned.

The installation-surface footboard-system, in other words the combination comprising the wall 108 and the footrest 100, can also be designed in such a manner that the footplate element 109 in the folded-in state is embedded in a planar manner in the installation surface, for example in the projection 501, or in a seat of the person seated in front, and is thus visually inconspicuous when not in use. The footrest 100 can also be retracted into a recess of the wall 108, 501 in such a manner that, for example by means of a panel, a closure or a cover, the entire footrest 100 can disappear in the wall 108. The wall can also be the rear or backrest including the foot frame of a seat, wherein the wall 108 is then arranged between the footrest 100 and the seat area 905 of the seat 900.

The footrest 100 can thus also be used in a seat arrangement within an aircraft cabin.

Furthermore, the wall-mounted footrest can also be used in a rest compartment for flight attendants, in a so-called crew rest compartment. The footrest 100 can be easy to install in a rest compartment. Furthermore, the footrest can be retrofitted to existing rest compartments or to existing walls. The weight of the footrest essentially need not be taken into account in the design of the seat because efficient introduction of the supporting forces can take place, for example, directly into the wall or the frame of a seat, instead of leading the forces directly into the floor by way of the seat. It is thus possible to implement a footrest that is of a lightweight design.

The wall-mounted footrest 100 can provide adjustable positions for placing one's feet, wherein the requirements of passengers of small stature can be taken into account just as well as those of tall passengers. By means of different positions, which can, for example, be predetermined by means of click-lock mechanisms, the stature of the passenger can be taken into account.

In this manner the footrest in the frontmost seat row of individual seating zones can be used in crew rest compartments and in other applications in an aircraft cabin.

The footplate element 109 is attached to the wall 108 in the aircraft cabin by way of four swing arms 102, 103, 102', 103'. The wall can, for example, be the wall 108 of a flight crew rest compartment, of a monument or of a class divider. During the folding movement from the stowed-away position shown in FIG. 1 and FIG. 5, the swing arm mechanism causes a guided rotation of the footplate element 109. In this context the term "swing arm mechanism" refers in particular to the selection of the length u, o of the swing arm, and to the distances of the rotary axes from each other.

The footplate element 109 can be locked or held with infinitely variable adjustment in at least one of the articulations or bearings by means of a frictionally engaged connection. Furthermore, a click-lock mechanism can be provided, in particular in the pivot joints and/or in the pivot bearings, which click-lock mechanism clicks into and locks in a predetermined number of positions.

During movement of the footplate element 109 positions can occur in which the direction of movement of the swing arms 102, 103, 102' and 103' relative to each other is not unequivocally defined, i.e. the direction of movement is statistically inadequately defined. Such a non-unequivocal direction of movement of the swing arms can be circumvented by the provision of eccentric positions of the swing arm bearings, in particular of the pivot bearings 104, 105, 104', 105'. As an alternative, inadequately defined directions of movement can be circumvented by means of springs, magnets or similar elements to establish a defined direction of movement.

Due to the swing arm mechanism, which comprises the swing arms 102, 103, the pivot bearings 104, 105, the footplate element 109 and the pivot joints 130, 131, the angle position of the footplate element is essentially rigid. The rigid angle position of the footplate element, in contrast to a single-axis footrest with a freely rotatable footplate element, can contribute to enhanced comfort. Rotation of the footplate element 109 by more than 180 degrees is prevented by the mutual support of the swing arms. A stable position, for example by means of a click-lock mechanism, may be considered to be comfortable.

The footrest can be integrated in the wall 108 in such a manner that in a folded-in position or in a stowed-away position it is embedded in the wall. In this embedded position the footplate area is situated so as to be planar to the wall surface. In other words, in an embedded state the wall plane and the footplate plane may rest so as to be essentially on top of each other or at least parallel to each other. In yet other words the planes are situated in the same plane. In particular, embedding, or close positioning against the wall can result in an increase of the space provided to passengers or occupants of the rest compartment or front seat rows, in particular in the region of the foot space 907. Stowing away the footplate element can result in the footrest 100 in this stowed-away state being perceived to be visually less conspicuous and thus more elegant than a superimposed and thus more conspicuous arrangement of the footrest.

When compared to the folded out positions, which are, for example, shown in FIG. 6, FIG. 7 and FIG. 8, in the stowed-away position of FIG. 5 or FIG. 1 the footplate element 109 may be situated at the greatest-possible distance that the length of the lower swing arm 103 permits from the floor 115. Consequently, a space underneath the footplate element 109 may arise that provides a minimum height, i.e. a distance from the floor 115 to a lower edge of the footplate element 109 of at least approximately the length u. In contrast to the length of the lower swing arm 103, the length of the upper swing arm 102 may be selected in such a manner that the stowed-away position is essentially made possible when the greatest-possible distance between the footplate element 109 and the floor is ensured. In the region exposed in the folded-in state, between the footplate element 109 and the floor 115, a passage can be released that makes it possible to elongate the foot space 907, i.e. to enlarge a free space between a wall 108 and a seat 900 underneath the footrest 109.

The wall-mounted footrest 100 can provide an economical option of improving the comfort and the ergonomics of footrests in regions of an aircraft cabin where these are otherwise avoided for reasons associated with complexity.

The installation option by means of the pivot bearings 104, 105 can make it possible to provide a space-saving solution which due to low integration expenditure can be implemented as retrofit solution or as an upgrade.

There exists the option or prospect of reducing the distance between the seat 900 and the wall 108, for example of a partition wall 108, because by means of the footrest 100 an increase in the seat comfort can result in a better ergonomic arrangement in spite of the reduced distance. By means of the footrest 100 improved use of space in the cabin can be achieved, and thus, for example, a greater number of seat rows can be provided in an aircraft. Consequently, the footrest can have an effect on the general space arrangement in the cabin.

Since the footrest is merely provided for foot support, functional separation between the seat 900 and the footrest 100 can be achieved, and for this reason the footrest can be designed to cope with lighter weights than does the seat 900. The different adjustment positions of the footrest may make it possible to cater for a broad spectrum of physical statures, i.e. a broad spectrum of heights of cabin attendants or passengers, with the provision of a single footrest.

The footrest 100 can render agreeable the spatial perception of FCRC-seats or conventional passenger seats, including those in different zones.

The positions shown in figures FIG. 1 to FIG. 8 are positions that are firmly locked by means of a click-lock mechanism. These positions are thus not freely swinging and are essentially stable despite changes in weight.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A footrest comprising:
    a footplate element;
    an upper swing arm; and
    a lower swing arm;
    wherein the footplate element comprises at least a first surface area;
    wherein a first end of the upper swing arm in the region of an upper edge of the first surface area is rotatably arranged on the first surface area by an upper pivot joint;
    wherein the lower swing arm in the region of a lower edge of the first surface area is rotatably arranged on the first surface area by a lower pivot joint;
    wherein the upper edge of the first surface area is arranged so as to be essentially parallel to the lower edge of the first surface area;
    wherein the length of the upper swing arm is shorter than the length of the lower swing arm;
    wherein the length of the upper swing arm is shorter than the length of the first surface area;
    wherein a second end of the upper swing arm comprises an upper pivot bearing;
    wherein a second end of the lower swing arm comprises a lower pivot bearing;
    wherein the upper pivot bearing and the lower pivot bearing are adapted for attaching the footrest to a wall;
    wherein the rotary axis of the upper pivot joint, the rotary axis of the lower pivot joint, the rotary axis of the upper pivot bearing and the rotary axis of the lower pivot bearing extend so as to be essentially parallel to each other; and
    wherein the footplate element can be rotated in such a manner that the rotary axis of the upper pivot bearing, the rotary axis of the upper pivot joint and the rotary axis of the lower pivot joint are situated in a shared plane.

2. The footrest of claim 1, further comprising:
    a further upper swing arm;
    a further lower swing arm; and
    wherein the footplate element comprises a second surface area that is arranged so as to be essentially parallel to the first surface area; and
    wherein the further upper swing arm, the further lower swing arm and the second surface area are in each case correspondingly arranged symmetrically relative to the upper swing arm, to the lower swing arm and to the first surface area.

3. The footrest of claim 1, wherein at least one pivot bearing and/or at least one pivot joint of the footrest are/is adapted for being lockable in a predeterminable number of positions.

4. The footrest of claim 1, wherein at least one pivot bearing and/or at least one pivot joint of the footrest comprises an electric motor.

5. The footrest of claim 1, wherein the footplate element comprises a footplate profile, wherein the footplate profile is adapted for essentially preventing any slipping from the footplate element.

6. The footrest of claim 1, wherein the footplate element can be rotated in such a manner that a rotary axis of the upper pivot joint and a rotary axis of the lower pivot joint are essentially positioned on a shared plane with a rotary axis of the upper pivot bearing and a rotary axis of the lower pivot bearing.

7. The footrest of claim 1, wherein the footplate element can be rotated in such a manner that the rotary axis of the upper pivot bearing, the rotary axis of the upper pivot joint and the rotary axis of the lower pivot bearing are situated in a first shared plane and that the rotary axis of the upper pivot joint and the rotary axis of the lower pivot joint are situated in a second shared plane; and
wherein the first shared plane and the second shared plane intersect.

8. An item of equipment for an aircraft, comprising:
a wall; and
a footrest, the footrest comprising:
a footplate element;
an upper swing arm;
a lower swing arm; and
wherein the footplate element comprises at least a first surface area;
wherein a first end of the upper swing arm in the region of an upper edge of the first surface area is rotatably arranged on the first surface area by an upper pivot joint;
wherein the lower swing arm in the region of a lower edge of the first surface area is rotatably arranged on the first surface area by a lower pivot joint;
wherein the upper edge of the first surface area is arranged so as to be essentially parallel to the lower edge of the first surface area;
wherein the length of the upper swing arm is shorter than the length of the lower swing arm;
wherein the length of the upper swing arm is shorter than the length of the first surface area;
wherein a second end of the upper swing arm comprises an upper pivot bearing;
wherein a second end of the lower swing arm comprises a lower pivot bearing;
wherein the upper pivot bearing and the lower pivot bearing are adapted for attaching the footrest to a wall;
wherein the rotary axis of the upper pivot joint, the rotary axis of the lower pivot joint, the rotary axis of the upper pivot bearing and the rotary axis of the lower pivot bearing extend so as to be essentially parallel to each other;
wherein the footplate element can be rotated in such a manner that the rotary axis of the upper pivot bearing, the rotary axis of the upper pivot joint and the rotary axis of the lower pivot joint are situated in a shared plane; and
wherein the footrest by at least one of the pivot bearings is attached to the wall.

9. The item of equipment of claim 8, wherein in the case of attachment of the footrest by at least the upper pivot bearing and the lower pivot bearing to the wall, a distance between the upper pivot bearing and the lower pivot bearing is greater than the length of the first surface area.

10. The item of equipment of claim 8, wherein the wall comprises a recess, wherein the footrest can be arranged so as to be located in the recess of the wall in an essentially planar manner.

11. The item of equipment of claim 8, wherein the footrest is coupled to the wall in an essentially planar manner, and wherein in a folded-in state of the footplate element a space is provided between the footplate element and a floor.

12. A seat arrangement, comprising:
a wall;
a seat; and
a footrest, the footrest comprising:
a footplate element;
an upper swing arm; and
a lower swing arm;
wherein the footplate element comprises at least a first surface area;
wherein a first end of the upper swing arm in the region of an upper edge of the first surface area is rotatably arranged on the first surface area by an upper pivot joint;
wherein the lower swing arm in the region of a lower edge of the first surface area is rotatably arranged on the first surface area by a lower pivot joint;
wherein the upper edge of the first surface area is arranged so as to be essentially parallel to the lower edge of the first surface area;
wherein the length of the upper swing arm is shorter than the length of the lower swing arm;
wherein the length of the upper swing arm is shorter than the length of the first surface area;
wherein a second end of the upper swing arm comprises an upper pivot bearing;
wherein a second end of the lower swing arm comprises a lower pivot bearing;
wherein the upper pivot bearing and the lower pivot bearing are adapted for attaching the footrest to a wall;
wherein the rotary axis of the upper pivot joint, the rotary axis of the lower pivot joint, the rotary axis of the upper pivot bearing and the rotary axis of the lower pivot bearing extend so as to be essentially parallel to each other;
wherein the footplate element can be rotated in such a manner that the rotary axis of the upper pivot bearing, the rotary axis of the upper pivot joint and the rotary axis of the lower pivot joint are situated in a shared plane;
wherein the wall comprises a wall surface that essentially faces the seat;
wherein by the pivot bearings the footrest is arranged in such a manner on the wall surface facing the seat that a movement of the footplate element of the footrest away from the wall reduces a distance between the seat and the footplate element.

13. An aircraft with at least one of:
(i) a footrest, the footrest comprising:
a footplate element;
an upper swing arm; and
a lower swing arm;

wherein the footplate element comprises at least a first surface area;
wherein a first end of the upper swing arm in the region of an upper edge of the first surface area is rotatably arranged on the first surface area by an upper pivot joint;
wherein the lower swing arm in the region of a lower edge of the first surface area is rotatably arranged on the first surface area by a lower pivot joint;
wherein the upper edge of the first surface area is arranged so as to be essentially parallel to the lower edge of the first surface area;
wherein the length of the upper swing arm is shorter than the length of the lower swing arm;
wherein the length of the upper swing arm is shorter than the length of the first surface area;
wherein a second end of the upper swing arm comprises an upper pivot bearing;
wherein a second end of the lower swing arm comprises a lower pivot bearing;
wherein the upper pivot bearing and the lower pivot bearing are adapted for attaching the footrest to a wall;
wherein the rotary axis of the upper pivot joint, the rotary axis of the lower pivot joint, the rotary axis of the upper pivot bearing and the rotary axis of the lower pivot bearing extend so as to be essentially parallel to each other,
wherein the footplate element can be rotated in such a manner that the rotary axis of the upper pivot bearing, the rotary axis of the upper pivot joint and the rotary axis of the lower pivot joint are situated in a shared plane;
(ii) an item of equipment for an aircraft, comprising:
a wall; and
a footrest, the footrest comprising:
a footplate element;
an upper swing arm; and
a lower swing arm;
wherein the footplate element comprises at least a first surface area;
wherein a first end of the upper swing arm in the region of an upper edge of the first surface area is rotatably arranged on the first surface area by an upper pivot joint;
wherein the lower swing arm in the region of a lower edge of the first surface area is rotatably arranged on the first surface area by a lower pivot joint;
wherein the upper edge of the first surface area is arranged so as to be essentially parallel to the lower edge of the first surface area;
wherein the length of the upper swing arm is shorter than the length of the lower swing arm;
wherein the length of the upper swing arm is shorter than the length of the first surface area;
wherein a second end of the upper swing arm comprises an upper pivot bearing;
wherein a second end of the lower swing arm comprises a lower pivot bearing;
wherein the upper pivot bearing and the lower pivot bearing are adapted for attaching the footrest to a wall;
wherein the rotary axis of the upper pivot joint, the rotary axis of the lower pivot joint, the rotary axis of the upper pivot bearing and the rotary axis of the lower pivot bearing extend so as to be essentially parallel to each other;
wherein the footrest by at least one of the pivot bearings is attached to the wall, and
(iii) a seat arrangement, comprising:
a wall;
a seat; and
a footrest, the footrest comprising:
a footplate element;
an upper swing arm; and
a lower swing arm;
wherein the footplate element comprises at least a first surface area;
wherein a first end of the upper swing arm in the region of an upper edge of the first surface area is rotatably arranged on the first surface area by an upper pivot joint;
wherein the lower swing arm in the region of a lower edge of the first surface area is rotatably arranged on the first surface area by a lower pivot joint;
wherein the upper edge of the first surface area is arranged so as to be essentially parallel to the lower edge of the first surface area;
wherein the length of the upper swing arm is shorter than the length of the lower swing arm;
wherein the length of the upper swing arm is shorter than the length of the first surface area;
wherein a second end of the upper swing arm comprises an upper pivot bearing;
wherein a second end of the lower swing arm comprises a lower pivot bearing;
wherein the upper pivot bearing and the lower pivot bearing are adapted for attaching the footrest to a wall;
wherein the rotary axis of the upper pivot joint, the rotary axis of the lower pivot joint, the rotary axis of the upper pivot bearing and the rotary axis of the lower pivot bearing extend so as to be essentially parallel to each other;
wherein the wall comprises a wall surface that essentially faces the seat;
wherein by the pivot bearings the footrest is arranged in such a manner on the wall surface facing the seat that a movement of the footplate element of the footrest away from the wall reduces a distance between the seat and the footplate element.

* * * * *